(12) United States Patent
Jeyaseelan et al.

(10) Patent No.: US 8,775,550 B2
(45) Date of Patent: Jul. 8, 2014

(54) CACHING HTTP REQUEST AND RESPONSE STREAMS

(75) Inventors: Thomas Anand Jeyaseelan, Kirkland, WA (US); Jacob DongJu Kim, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 12/028,638

(22) Filed: Feb. 8, 2008

(65) Prior Publication Data

US 2009/0204682 A1 Aug. 13, 2009

(51) Int. Cl.
*G06F 15/16* (2006.01)
*H04L 29/08* (2006.01)

(52) U.S. Cl.
CPC ............... *H04L 67/02* (2013.01); *H04L 67/10* (2013.01)
USPC ............ 709/217; 709/234; 709/218; 709/212

(58) Field of Classification Search
CPC .............................. H04L 67/10; H04L 67/02
USPC .......................................... 709/217, 218, 234
See application file for complete search history.

(56) References Cited

U.S. PATENT DOCUMENTS

| | | | |
|---|---|---|---|
| 6,003,087 A | 12/1999 | Housel, III et al. | |
| 6,185,608 B1 * | 2/2001 | Hon et al. | 709/216 |
| 6,697,849 B1 | 2/2004 | Carlson | |
| 6,912,538 B2 | 6/2005 | Stapel et al. | |
| 7,028,091 B1 | 4/2006 | Tripathi et al. | |
| 7,117,504 B2 | 10/2006 | Smith et al. | |
| 2002/0065892 A1 * | 5/2002 | Malik | 709/206 |
| 2003/0120752 A1 | 6/2003 | Corcoran | |
| 2004/0044731 A1 * | 3/2004 | Chen et al. | 709/203 |
| 2004/0073604 A1 * | 4/2004 | Moriya et al. | 709/202 |

OTHER PUBLICATIONS

Unknown, "HTTP caching: request and response headers—Autarchy of the Private Cave," Oct. 18, 2006, retrieved on Nov. 14, 2007 from Internet at http://bogdan.org.ua/2006/10/18/http-caching-request-and-response-headers.html, 7 pages, US.

John Peterson, "A Simple Method for Caching HTTP Requests," retrieved on Nov. 14, 2007 from Internet at http://www.asp101.com/articles/john/httpcaching/default.asp, 3 pages, US.

Unknown, "HTTP Analyzer," retrieved on Nov. 14, 2007 from Internet at http://www.softpile.com/apphistory/http_analyzer_standard_edition.html, 4 pages, US.

(Continued)

*Primary Examiner* — Jude Jean Gilles
*Assistant Examiner* — Jaren M Means
(74) *Attorney, Agent, or Firm* — Bryan Webster; Andrew Sanders; Micky Minhas

(57) ABSTRACT

A client requests a web page from a server including aggregated content comprising a plurality of content items from a plurality of content providers. The server provides content items to the client from a cache accessible to the server if any of the content items are stored in the cache, and requests any remaining content items from their respective content providers. The server receives responses from the content providers and stores any cacheable responses (i.e., content items) in the cache. Aspects of the invention apply to any content request from a client, for example, updating a client's widget with a content item.

13 Claims, 5 Drawing Sheets

(56) References Cited

OTHER PUBLICATIONS

John Peterson, "Server-Side Caching Options," retrieved on Nov. 14, 2007 from Internet at http://www.asp101.com/articles/john/server_side_caching/index.asp, 4 pages, US.

Delaney, Kevin J., (Wall Street Journal) Google Helps Clients Get Personal, Aug. 22, 2005, 1-3 Pages.

Google debuts,, Google Gadgets, May 10, 2006, 1-2 pages.

Google, Sidebar to Launch Monday Aug. 21, 2005, 1-8 pages.

Ziff Davis Media Inc., Apple Previews Mac OSX "Tiger", Jun. 28, 2004, 8 pages.

Ziff Davis Media Inc., Mac 'widget' App Set to Make Windows Debut, Nov. 8, 2004, 1-4 pages.

* cited by examiner

CACHING HTTP REQUEST AND RESPONSE STREAMS

BACKGROUND

Web sites providing customized Internet based services, such as social networking websites (e.g., Windows Live Spaces, Facebook, and MySpace) and user specific home pages (e.g., the MSN.com homepage, AOL home, and Media NET), often aggregate content items from many sources, or content providers, and provide the aggregated content to a user on a network as a single web page. Each time the user (i.e., a client on the network) initially connects to, refreshes, or otherwise requests a web page, a server performs a multitude of resource intensive operations to retrieve the content for the page. For example, the server may have to make several requests to other servers (or server clusters) to gather content items to be included in the web page.

Many web site servers and the like employ the ASP.NET-based Web Application Architecture for providing customized pages to clients or users. A typical server that provides a customized service based on ASP.NET includes a parser, a web request object, and an aggregator. The parser breaks a web page request from a client into a plurality of requests for content items for the web page. The parser passes each content item request to the web request object originating in the server, (or multiple instances of the web request object) and the web request object forwards the request to a remotely-located content provider of the content item. In response, this content provider sends a web response containing the requested content item back to the server. The server receives the web response object and provides the content item to the aggregator. The aggregator receives the plurality of content items represented by the plurality of requests for content items produced by the parser, and assembles the received content items into the web page requested by the client. The server provides the assembled web page to the client as the requested web page.

Disadvantageously, these recurring multiple content item requests are resource intensive within the server such that if a significant number of users simultaneously request a web page, the server may slow down due to the number of active threads used to process the requests for content items sent to content providers. Additionally, the server waits for a response from each of the content providers with respect to each of the content item requests for each web page before rendering the web page and providing it to the client requesting the web page. The multitude of requests to content providers generated by the server, and the responses from the content providers also cause high network traffic, consuming large amounts of bandwidth, and potentially interfering with other network applications by causing delays for time sensitive traffic.

SUMMARY

Aspects of the invention permit a server responding to a request from a client to reduce resource consumption within the server, reduce network traffic, and provide a response to the client more quickly. Advantageously, server-side caching provides an in-memory storage mechanism for web requests that allows responses to be stored in a flexible and customizable manner, which mitigates the cost associated with web requests originating from the server, and is not intrusive to existing applications. According to aspects of the invention, requests for content do not wait on a web request component of the server and can instead fetch responses to the requests directly from a cache accessible to the server. For example, in one embodiment the cache services only hypertext transfer protocol requests, and is installed in the same address space (e.g., server or server farm) as its consumer (i.e., an application operating on the server making hypertext transfer protocol [HTTP] requests). In the alternative, the cache resides in a process or server apart from its consumer and aspects of the invention permit communication over a multitude of protocols (e.g., HTTP, FTP, HTTPS, TCP, Remote Procedure Calls, SOAP, and UDP) Operationally, the retrieval of content is abstracted from the consuming client such that the consuming client (i.e., the application making the requests) does not necessarily know where the data (i.e., content items) is actually served from.

A cacheable web request component, a cache lookup component, a cache, and a cache entry component embody aspects of the invention. A parser of a server receives a request for a web page having aggregated content including at least one content item and requests the content item from the cacheable web request component. The cacheable web request component forwards the request to the cache lookup component which determines whether the content item is cacheable as a function of a characteristic of the requested content items such as whether a uniform resource indicator is on a white list of the cache lookup component. If the content item is cacheable, the cache lookup component attempts to retrieve the content item from the cache. If the content item is found in the cache, the cache validates the cached content item, packages the cached content item as a response, and returns it the packed content item. If the content item is not found in the cache, or the cached content item fails validation (e.g., the cached content item has expired), then the content item is retrieved from the content provider of the content item using conventional means (e.g., issuing a network call). That is, the cache lookup component requests the content item from a web request component of the server, and the web request component retrieves the content item from a content provider of the content item and supplies the content item to the cache entry component. If the retrieved content item is cacheable (e.g., the content item includes cache directives such as HTTP 1.1 cache directives), the cache entry component packages the content item (i.e., a network response containing the content object from the content provider) in a cache object for storage in the cache and packages a copy of the content item for returning to an application requesting the content item. If the retrieved content item is not cacheable, the cache entry component forwards the content item to the cacheable web request component but does not store the retrieved content item in the cache. The cacheable web request component provides the received content item to an aggregator of the server. The aggregator collects the content items parsed from the web page request and presents the content items to the client as the requested web page.

For example, an ASP.NET Request/Response model implements System.Net.HttpWebRequest and System.Net.HttpWebResponse abstractions. In this example, ASP.NET Runtime associates a request with the server-side cache implementation, which checks its cache, makes a policy decision to use the cache entry, or makes the actual HTTP call to the content provider instead. The response from the content provider is returned to the client in the ASP.NET Runtime's System.Net.HttpWebResponse implementation. In essence, this caching model extends the existing System.Net.HttpWebRequest class to provide a web request component version referred to as a CacheableHttpWebRequest for retrieving responses from the cache, and extends the System.Net.Http- WebResponse class to provide a cache entry component for storing cacheable responses in the cache.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the invention enable server side caching for content items provided to clients or users of applications running on the server. Components of the invention store cacheable content in a cache accessible to the server (i.e., to the applications running on the server) and retrieve cacheable content from the cache when requested by the client. In one embodiment, aspects of the invention override and extend components of the ASP.NET architecture such that responsiveness and efficiency of applications using the ASP.NET architecture and running on the server are improved. Aspects of the invention may be implemented within other architectures such as the Java Virtual Machine and the Microsoft.NET Framework.

Figure 1:
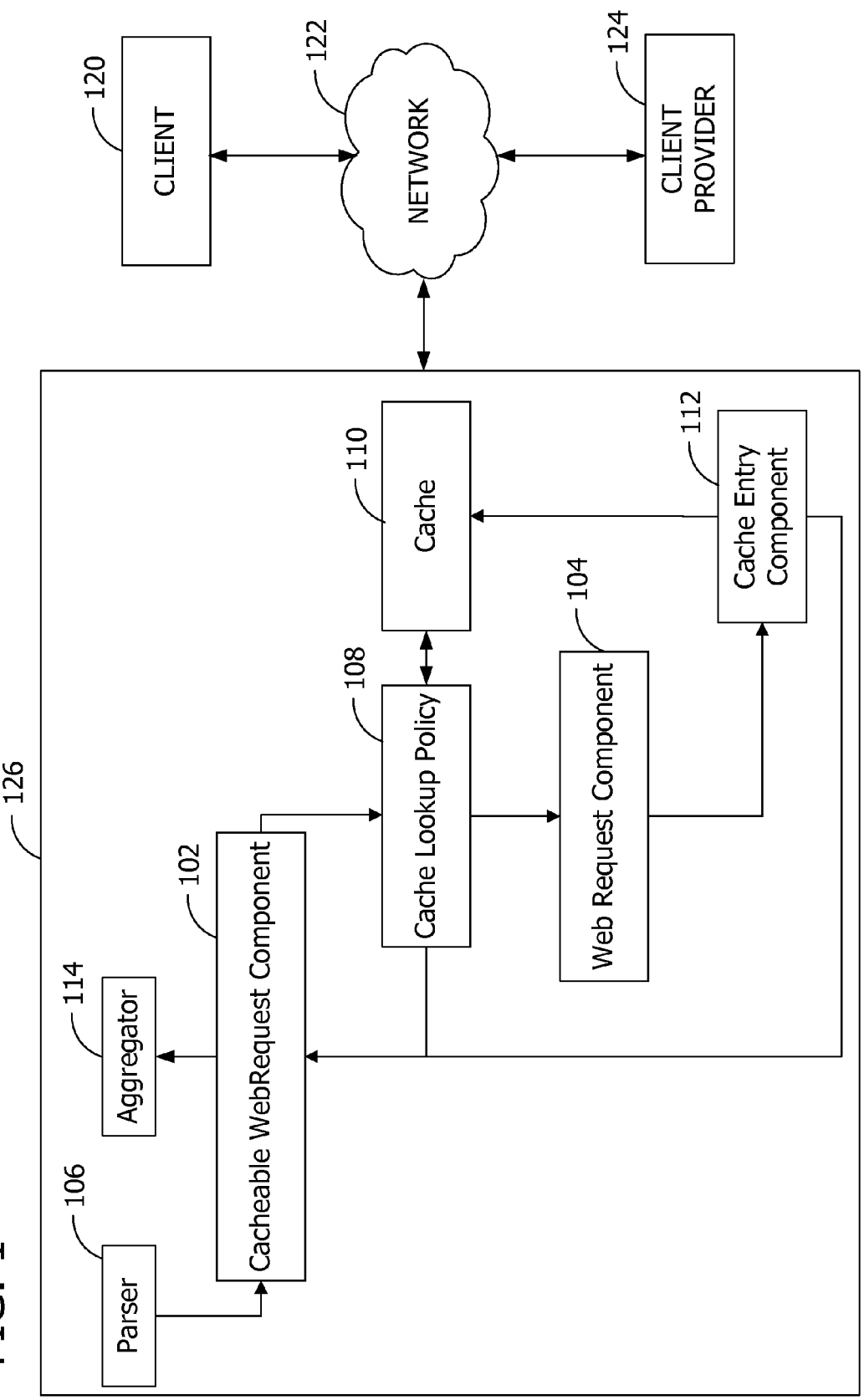
FIG. 1 is an exemplary block diagram illustrating software components for caching and retrieving content items to be provided to a client from a content provider, according to one embodiment of the invention.

Referring to FIG. 1, a cacheable web request component 102 overrides a web request component 104 of the ASP.NET architecture in a server 126 implementing the ASP.NET architecture. This may be implemented, for example, by inserting a public override into ASP.NET components running on the server 126. One example of a function call for the public override is "public override WebResponse GetResponse( );". Thus, when the server 126 receives a hypertext transfer protocol (HTTP) request (e.g., a request for a web page or a request to refresh data in a widget) from a client 120 (i.e., a computer or computing device, or a user thereof) via a network 122 at a parser 106 of the server, the parser 106 parses the request into a request for a content item and directs the content item request to the cacheable web request component 102 instead of the web request component 104.

The cacheable web request component 102 implements a cache lookup policy 108 to determine whether the requested content item is available in a cache 110 accessible to the server (e.g., an ASP.NET cache), and if it is available, clones the content item from the cache 110 and returns the cloned content item to the cacheable web request component 102. In one embodiment, determining whether the requested content item is available in the cache is implemented by the function call "private bool IsCacheable( );", and the content item stored in the case is implemented by the function call "private bool Cache.TryGetCache(HttpWebRequest thisRequest, out CacheableHttpWebResponse response);". If the requested content item is not available in the cache 110, then the cache lookup policy 108 (i.e., cache lookup component) forwards the request for the content item to the web request component 104.

The web request component 104 retrieves the content item from a content provider 124 of the content item via the network 122 and provides the content item to a cache entry component 112 of the server 126. The cache entry component 112 clones the retrieved content item to the cache 110 if the content item is cacheable and returns the content item to the cacheable web request component 102. In one embodiment, the content item request is forwarded to the web request component 104 and the response from the content provider 124 is processed by the cache entry component 112 by the function call "private HttpWebResponse GetResponseFromNetwork( ) {CacheableHttpWebResponse cres=null; using (HttpWebResponse res=base.GetResponse( ) {CacheableHttpWebResponse cres=CacheableHttpWebResponse.Create (res);} Cache.Insert(cres); return cres;};". One exemplary implementation for handling the response from the content provider is shown in Appendix A.

The cacheable web request component 102 provides the returned content item to an aggregator 114 of the server. The aggregator 114 collects the content items indicated by the parsed HTTP request and delivers the collected content items to the client 120. In one embodiment, the server 126 renders the collected content items to represent the requested web page and returns the rendered web page to the client 120. In an alternative embodiment, the client 120 provides a series of requests for content items to the server 126, and the server 126 provides the collected content items to an application (e.g., a browser) of the client 120 which the application renders to generate the web page.

Figure 2:
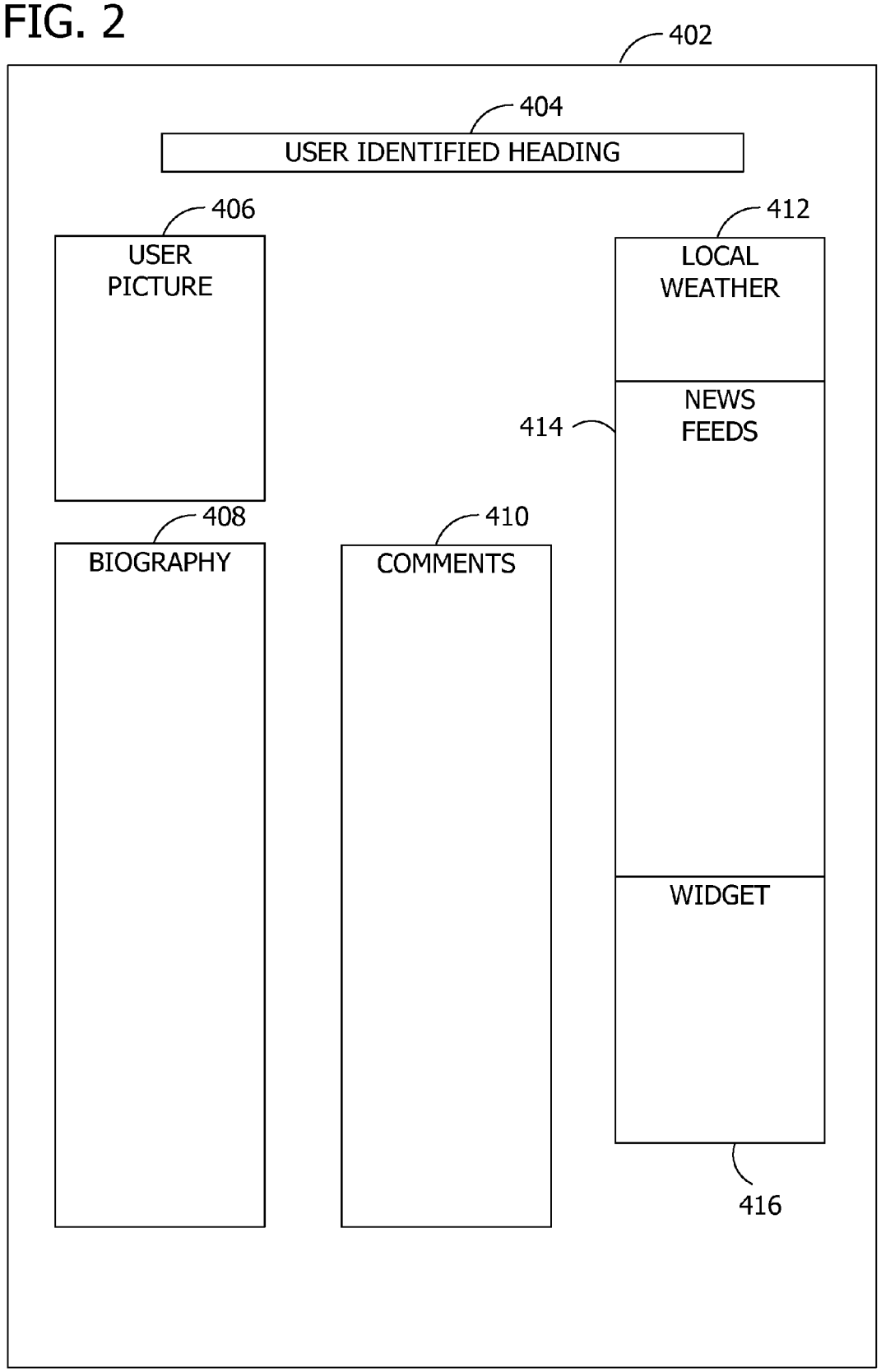
FIG. 2 is a block diagram of an exemplary web page having aggregated content according to one embodiment of the invention.

Referring to FIG. 2, an example of a web page comprising aggregated content is shown in the form of a social networking profile web page of a user. Content items of the web page 402 include a user defined heading 404, a user selected picture 406, a textual biography 408 provided by the user, comments 410 from other users, weather local to the user 412, news feeds 414 selected by the user, and a widget 416 included by the user. One skilled in the art will recognize that other content items may be included in the web page 402 without deviating from the scope of the invention. Each time the user requests the web page 402 from a server providing the web page, the server gathers the content items of the web page 402, render the page, and provide the rendered page to the user. For each content item not stored locally to the server, the server requests the content items from a content provider of the content item each time that the server is to provide the web page 402 to the client or user.

The content items of the web page 402 are stored by a variety of content providers. For example, the user picture 406 may be stored and retrieved from a gallery associated with the server. The gallery may be located on the server, or on another server associated with the server. The user defined heading 404, biography 408, and comments may be stored in a text database associated with the server. Requesting data from these associated servers (i.e., the gallery and text database) may be relatively expedient. However, in the instant example, the local weather data 402 is maintained by a weather service (e.g., The Weather Channel), the news feeds 414 are provided from a variety of really simple syndication sources, and the widget 416 is provided by a game website. Thus, each time the web page 402 is refreshed or requested, the server collects the content items from the weather service, the really simple syndication sources, and the game website for their respective content items. Aspects of the invention cache these content items as indicated in data associated with each of the content items and retrieve the content items from the cache, such that the server may not contact these external content providers each time the web page 402 is requested.

The cache maintains stored content items for a period of validity indicated by data in a header of the content item as received from its content provider. For example, if the weather service updates weather data on the hour, then the cache deletes the local weather content item 412 from the server upon a request following the beginning of a new hour and retrieves a new copy of the local weather content item 412 from the weather service.

Figure 3:
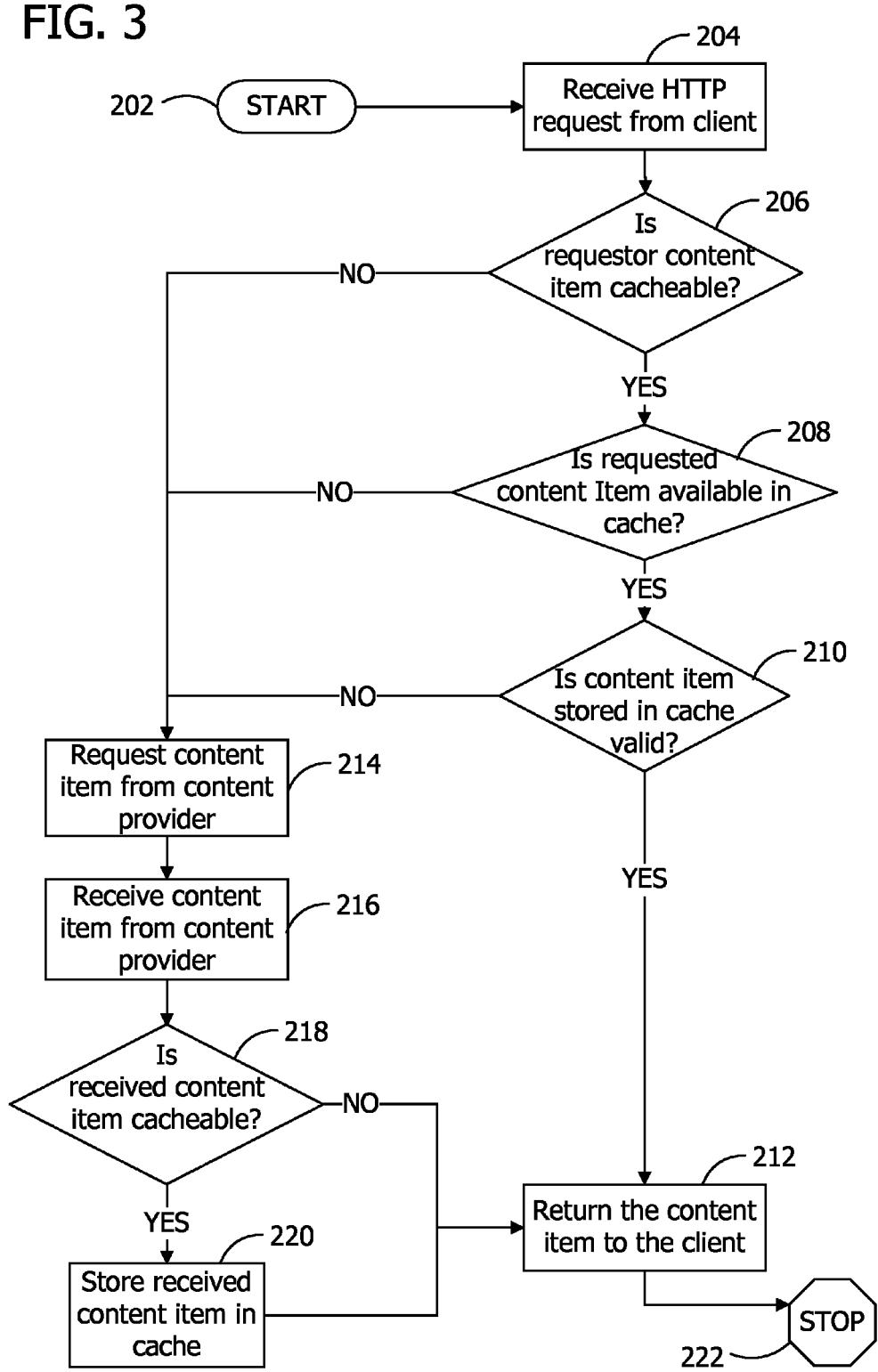
FIG. 3 is an exemplary flow chart illustrating operation of a server for responding to a hypertext transfer protocol request from a client according to one embodiment of the invention.

Referring to FIG. 3, a method of responding to a request from a client starts at 202, and at 204, a server receives the request from the client. At 206, the server determines whether the content item is cacheable. In one embodiment, the content item is cacheable if a uniform resource indicator of the content item is stored in a white list of the server (e.g., a white list associated with a cache policy of the server). If the content item is cacheable, then at 208, the server determines whether the content item is stored in a cache accessible to the server. If the content item is stored in the cache, then at 210, the server evaluates the validity of the content item. This may include, for example, determining whether the content item has expired, and whether the content item stored in the cache is available to the particular client requesting the content item. If the content item stored in the cache is valid, then the server clones the content item stored in the cache and returns the content item to the client at 212.

If the requested content item is not cacheable at 206, not available at 208, or not valid at 210, then the server requests a copy of the content item from a content provider of the content item at 214 and receives a copy of the content item from the content provider at 216. At 218, if the received copy of the content item is cacheable, then at 220, a data stream of the received content item is cloned to the cache, and a header of the received content item is stored in a web header collection object. At 212, the received copy of the content item is provided to the client, and the method ends at 222.

It is contemplated that variations in the method of FIG. 3 are possible without departing from the scope of the invention. For example, at 218, the server may determine whether to store the received content item in the cache as a function of whether the requested content item was cacheable at 206. Additionally, the determinations in 206, 208, and 210 may occur in a different order than described without altering the function of the described method. It is also contemplated that the request from the client may be an HTTP request or some other request form such as, for example, a hypertext transfer protocol secure request, or an extensible markup language request.

Figure 4:
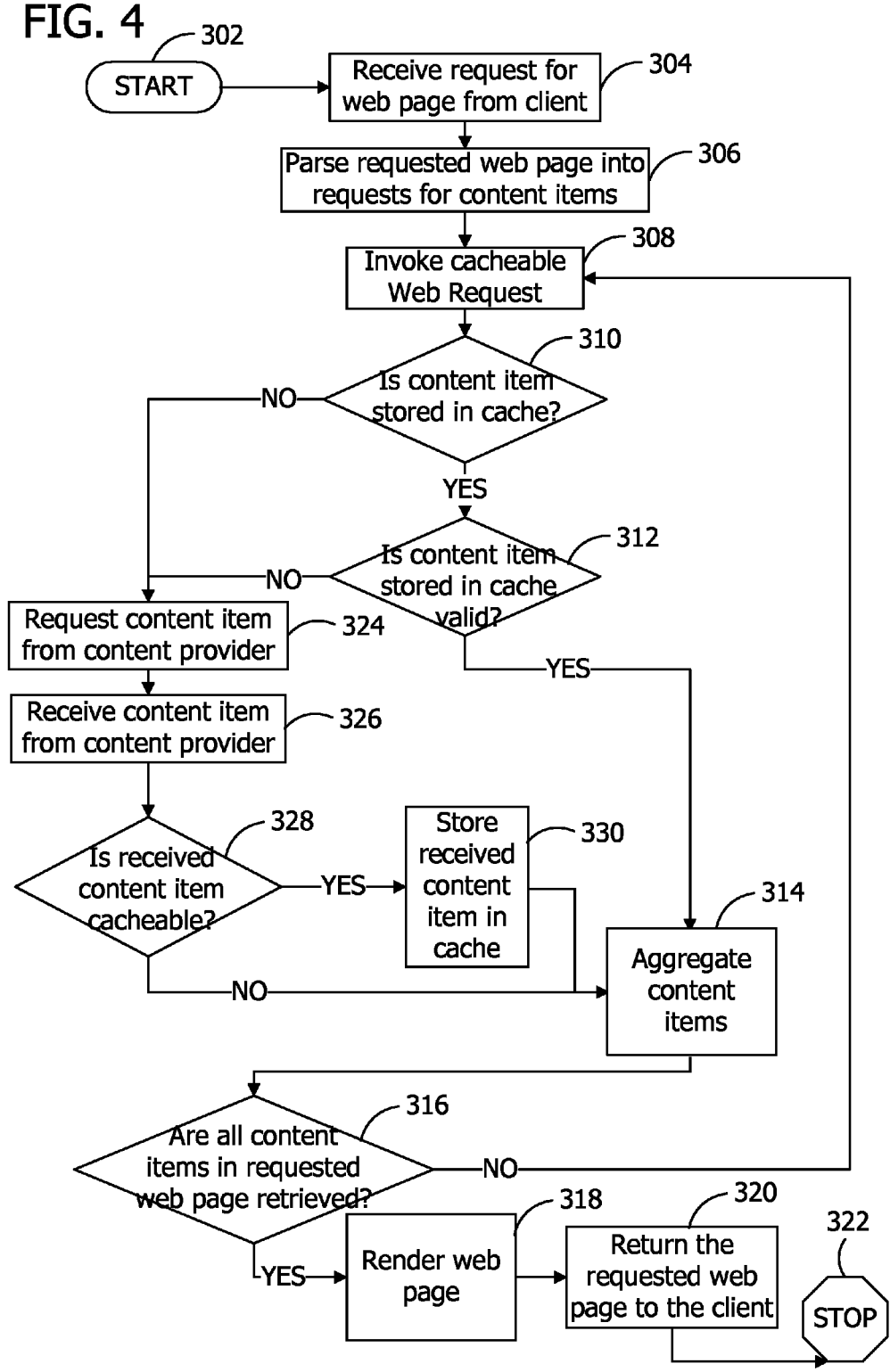
FIG. 4 is an exemplary flow chart illustrating operation of a server for providing a web page containing aggregated content to a client and caching content items of the aggregated content, according to one embodiment of the invention.

Referring to FIG. 4, a method according to one embodiment provides a web page having aggregated content (e.g., web page 402 of FIG. 2) to a client. The method starts at 302 when a client or user requests a web page having aggregated content from a server at 304. The web page requested by the client is parsed at 306 into one or more requests for content items of the aggregated content. At 308, the server executes a cacheable web request to retrieve a content item. It is contemplated that the server may optionally invoke multiple, simultaneous instances of the process to retrieve a content item described as follows if multiple requests for content items were generated at 306.

At 310, the server determines whether a requested content item is stored in a cache accessible to the server. If the requested content item is stored in the cache, then the server proceeds at 312 to determine whether the stored content item is valid. Determining the validity of the content item comprises enforcing the limitations of the content item described in an HTTP header of the content item. For example, the server may determine whether the content item has exceeded a time limit for validity, or whether the content item is limited to certain clients and whether the client is one of the clients to which the content item is limited. Assuming that the content item is available in the cache at 310 and valid for the client requesting the content item at 312, then the server prepares the content item for transmission to the client at 314 by collecting the retrieved content item with any other retrieved content items. At 316, the server determines whether content items of the web page requested by the client have been retrieved, and if not, then the server returns to 308 and retrieves the next content item. If the content items have been retrieved, then at 318, the server renders the web page requested by the client from the aggregated content items, returns the rendered web page to the client at 320, and the method ends at 322.

If a content item is not stored in the cache at 310, or the content item stored in the cache is not valid for the client requesting the content item at 312, then at 324, the server requests the content item from a content provider of the content item. At 326, the server receives the content item from the content provider and determines whether the received content item is cacheable at 328. To determine whether the received content item is cacheable, the server examines an HTTP header of the received content item for data such as an expiration time of the received content item and a uniform resource indicator of the content provider (to be compared to a white list of the server cache as described above). If the content item is cacheable, then the server clones the received content item to the cache of the server at 330 and prepares the received content item for transmission to the client at 314 by aggregating the received content item with the other content items indicated by the requested web page. If the content item is not cacheable, the server prepares the received content item for transmission to the client at 314, but does not enter the received content item into the cache associated with the server.

In one embodiment, the cache associated with the server is a memory local to the server such as a hard drive or random access memory of the server. It is also contemplated that the server may actually be a cluster (i.e., farm) of servers, and the cache may be implemented on one or more servers within the cluster or farm. A content provider may not be associated in any way with the server providing the web page to the client.

One skilled in the art will recognize that many of the processes described herein may occur simultaneously when multiple content items are requested. For example, the cache policy component may be searching the cache for a first content item while the httpWebRequest component is retrieving a second content item from a content provider. Additionally, there may be multiple instances of a component. For example, the HttpWebRequest component may simultaneously have a first instance retrieving a first content item from a content provider while a second instance is retrieving a second content item from another content provider (or the same content provider).

Figure 5:
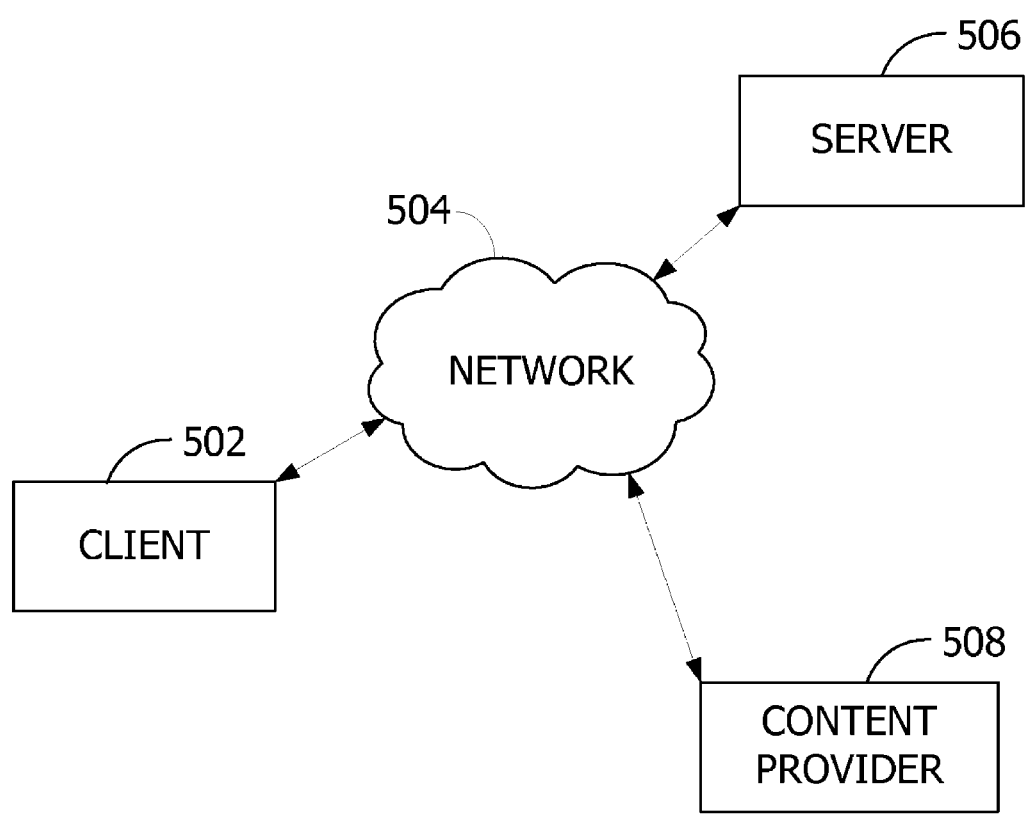
FIG. 5 is an exemplary operating environment of the invention.

Referring to FIG. 5, an exemplary operating environment is shown including a client 502, a network 504, a server 506, and a content provider 508. The client 502 sends an HTTP request to the server 506 via the network 504, and the server 506 gathers content items requested by the client 502 from content providers such as content provider 508 via the network 504. The server 506 responds to the request from the client 502 with the content items gathered from the content provider 508 via the network 504.

An embodiment of the invention includes a method of providing content to a client comprising receiving, at a server, a request from the client for a web page containing aggregated content and including at least one content item. This method also includes parsing the web page request from the client into at least one request for a content item, determining whether the requested content item is cacheable and stored in a cache accessible to the server, retrieving the stored content item from the cache as function of the determining, retrieving any remaining content items not stored in the cache from one or more content providers, aggregating the content items retrieved from the cache and the content items retrieved from the content providers, and providing the aggregated content items to the client as the web page.

In a method embodying aspects of the invention, determining whether the requested content item is cacheable comprises determining whether a uniform resource indicator of the content item is on a white list of cacheable entities associated with a cache entry policy component of the server.

In another embodiment, determining whether the requested content item is stored in a cache accessible to the server comprises examining one or more headers of a copy of the content item stored in the cache to determine whether the copy is limited to a particular group of clients and examining the one or more headers of the copy of the content item stored in the cache to determine whether the copy is expired.

An embodiment of the method of providing content to the client further comprises determining whether a content item retrieved from a content provider is cacheable and storing the content item in the cache if the content item is cacheable, wherein storing the retrieved content item comprises storing a copy of the content item as retrieved from the content provider. Additionally, storing the content item in the cache comprises storing a data stream of the content item in the cache as a memory stream and a header of the content item in a web header collection object, and retrieving the content item from the cache comprises exposing the content item as a stream such that the server does not differentiate between a content item retrieved from the cache and a content item retrieved from the content provider.

In an embodiment of the method of providing content to the client, retrieving the stored content item from the cache comprises cloning the content item stored in the cache or creating a reference copy of the content item stored in the cache.

A method of providing content to the client embodying aspects of the invention further comprises checking the content item retrieved from the cache for validity and deleting the content item stored in the cache if the content item present in cache is not valid for any client.

A computer readable storage media embodying aspects of the inventions has computer-executable components for retrieving aggregated content in response to a request from a client. The components comprise a parser for receiving at a server a request for a web page having aggregated content including at least one content item, and for parsing the web page request into at least one request for a content item. The components also comprise a cache accessible to a server for storing a plurality of content items and a cache lookup responsive to a request for a content item from the parser for determining whether a valid copy of the content item is stored in the cache and for retrieving the content item from the cache or sending a request for external retrieval of the content item as a function of the determining. A web request object of the components is responsive to a request for external retrieval of a content item for retrieving a valid copy of the content item from a content provider of the content item. In this embodiment, the components also comprise a cache entry component for receiving a valid copy of a content item from the web request object and providing the received valid copy of the content item to the cache for storage.

In an embodiment, the computer readable storage media having computer-executable components for retrieving aggregated content in response to a request from a client further comprises an aggregator for receiving and aggregating the content items to generate the web page requested by the client, wherein the cache lookup provides the copy of the content item retrieved from the cache to the aggregator. Additionally, the web request object provides the content item to the aggregator, and the cache entry component provides the content item retrieved from the content provider to the aggregator.

In an embodiment of the computer readable storage media having computer-executable components for retrieving aggregated content in response to a request from a client, the cache lookup determines whether a content item is stored in the cache by determining whether the content item is cacheable. Alternatively or additionally, the cache lookup determines whether a content item is cacheable by determining whether a uniform resource indicator of the content item is on a white list associated with the cache entry component of the server and/or the cache lookup determines whether a content item stored in the cache is valid by examining one or more headers of a copy of the content item stored in the cache to determine whether the copy is limited to a particular group of clients and examining the one or more headers of the copy of the content item stored in the cache to determine whether the copy is expired.

In an embodiment of the computer readable storage media having computer-executable components for retrieving aggregated content in response to a request from a client, the cache entry component stores the content item in the cache by storing a data stream of the content item in the cache as a memory stream and a header of the content item in a web header collection object, and the cache lookup retrieves the content item from the cache by exposing the content item as a stream such that the server does not differentiate between a content item retrieved from the cache and a content item retrieved from the content provider.

Moreover, the cache lookup retrieves the stored content item from the cache by cloning the content item stored in the cache according to one embodiment.

In an embodiment of the computer readable storage media having computer-executable components for retrieving aggregated content in response to a request from a client, the cache lookup checks the content item retrieved from the cache for validity and deletes the content item stored in the cache if the content item present in cache is not valid for any client.

Another method embodying aspects of the invention involves responding to a hypertext transfer protocol (HTTP) request from a client requesting content via a web request object and a web response object associated therewith. The method comprises overriding the web request object with a cacheable web request object in response to receiving the HTTP request from the client at a server, implementing a cache lookup policy via the cacheable web request object, determining whether the HTTP request is cacheable as a function of the cache lookup policy, locating a response in a cache accessible to the server as a function of the determining, providing the response in the cache to the client if the response is located in the cache and cloning the response, sending a request for a web HTTP request if the response is not located in the cache, and receiving a web HTTP response from a content provider in response to the web HTTP request and providing the web HTTP response from the content provider to the client.

In an embodiment of the method of responding to a HTTP request from a client, determining whether the HTTP request is cacheable comprises comparing a uniform resource indicator of the HTTP request to a white list of the server according to the cache lookup policy.

An embodiment of the method of responding to a HTTP request from a client further comprises determining, by a cache entry policy of the server, whether the web HTTP response from the content provider is cacheable, and storing a data stream of the web HTTP response from the content provider in the cache and a header of the web HTTP response from the content provider in a web header collection object as a function of determining whether the web HTTP response from the content provider is cacheable.

The order of execution or performance of the operations in embodiments of the invention illustrated and described herein is merely illustrative, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that matter contained in the above description and shown in the accompanying drawings shall be interpreted as illustrative and not in a limiting sense.

APPENDIX A

Response Handling (C# code)

```
// In a class called CacheManager:
    /// <summary>
    /// Returns a cacheable response object.
    /// </summary>
    /// <param name="request"></param>
    /// <returns></returns>
    public WebResponse GetResponse(HttpWebRequest request)
    {
        WebResponse response;
        bool isCacheable = this.IsRequestCacheable(request);
        if (isCacheable)
        {
            string key = this.GetKey(request);
            CachedHttpWebResponse cachedResponse;
            bool success = this.TryGetFromCache(key, out cachedResponse);
            if (!success)
            {
                // Close the network stream, and use a different stream for the client.
                using (HttpWebResponse networkResponse = request.GetResponse( ) as HttpWebResponse)
                {
                    CachedHttpWebResponse newCachedResponse = CacheableHttpWebResponse.CreateCachedWebResponse(networkResponse) as CachedHttpWebResponse;
                    this.AddToCache(key, newCachedResponse);
                    response = CacheableHttpWebResponse.CloneResponse(newCachedResponse);
                }
            }
            else
            {
                response = CacheableHttpWebResponse.CloneResponse(cachedResponse);
            }
        }
        else
        {
            // Pass the network stream to the client, so do not close here.
            HttpWebResponse networkResponse = request.GetResponse( ) as
```

APPENDIX A-continued

Response Handling (C# code)

```
HttpWebResponse;
    response =
CacheableHttpWebResponse.CreateUncachedWebResponse(networkResponse) as
UncachedHttpWebResponse;
    }
    return response;
}
```

What is claimed is:

1. A method of providing content to a plurality of clients comprising:

defining, at a server, a web request object of a web application framework;

overriding, at the server, the web request object with a cacheable web request object, said cacheable web request object derived from the web request object;

receiving, at the server, a request from a particular client of the plurality of clients for a web page containing aggregated content, said web page including at least one content item;

parsing the web page request from the particular client into at least one request for a requested content item from the cacheable web request object;

determining, via the cacheable web request object, whether retrieval of the requested content item from one or more content providers is required, wherein the determination that the requested content item requires retrieval comprises at least one of the following:

determining the content item is not cacheable;

determining the content item is not present in a cache accessible to the server; and, determining the content item is cacheable and stored in a cache accessible to the server and is not valid;

retrieving, via the cacheable web request object, any content items requiring retrieval from one or more content providers;

storing, in the cache, each retrieved content item as retrieved from the content provider that is cacheable and valid;

maintaining the content item stored in the cache when the content item is valid as indicated by a web header collection object and deleting the content item stored in the cache when the content item is no longer valid as indicated by the web header collection object, said web header collection object storing a header of the content item including information indicating whether the content item is valid;

exposing the retrieved content item stored in the cache as a stream such that the server does not differentiate between a content item retrieved from the cache and a content item retrieved from the content provider;

retrieving at least one cached content item corresponding to the at least one request for a content item from the cacheable web request object;

aggregating the results yielded by the cacheable web request object from the content item requests that were parsed from the web page request; and providing the aggregated content items to the particular client as the web page.

2. The method of claim 1, wherein determining whether the requested content item is valid comprises analyzing data representative of the content item that indicates whether a uniform resource indicator of the content item is on a white list of cacheable entities associated with a cache entry policy component of the server.

3. The method of claim 1, wherein determining whether the requested content item is valid comprises examining data related by the web header collection object of the content item stored in the cache to determine whether the copy is expired.

4. The method of claim 1 wherein retrieving the stored content item from the cacheable web request object comprises cloning the content item stored in the cache or creating a reference copy of the content item stored in the cache.

5. A server comprising one or more computing devices and one or more computer readable storage media having computer-executable components stored thereon that, when executed, retrieve aggregated content in response to a request from a particular client of a plurality of clients, said components comprising:

a parser for receiving at the server a request for a web page, said web page having aggregated content including at least one content item, and for parsing the web page request into at least one request for a content item;

a cache accessible to the server for storing a plurality of content items;

a cacheable web request object for receiving the at least one request from the parser;

a cache lookup responsive to a request for a content item from the cacheable web request object for determining whether the content item is to be retrieved from the cache or retrieved from a content item provider, and for sending a request for retrieval of the content item as a function of said determining, wherein data related by a web header collection object of the content item indicates whether the cache lookup should continue to maintain the content item in the cache as valid;

an aggregator for receiving and aggregating the content items to generate the web page requested by the client, wherein the cache lookup provides the copy of the content item retrieved from the cache to the aggregator;

a web request object responsive to said request for external retrieval of a content item from the cache lookup for retrieving a copy of the content item from a content provider of the content item, wherein the cacheable web request object is derived from and overrides said web request object; and a cache entry component for receiving a copy of a content item from the web request object and providing the received copy of the content item to the cache for storage, wherein the cache entry component stores the copy of the content item in the cache by storing a data stream of the content item in the cache as a memory stream and storing a header of the content item in the web header collection object, and wherein the cache lookup maintains the copy of the cached content item by analyzing data related by the web header collection object, and retrieves the content item from the cache by exposing the content item as a stream such that the server does not differentiate between a content item retrieved from the cache and a content item retrieved from the content provider.

6. The server of claim 5 wherein the web request object provides the content item to the aggregator.

7. The server of claim 5 wherein the cache entry component provides the content item retrieved from the content provider to the aggregator.

8. The server of claim 5 wherein the cache lookup determines whether a content item is stored in the cache by examining data representative of the content item to determine whether the content item is cacheable.

9. The server of claim 5 wherein the cache lookup determines whether to cache a content item by analyzing data representative of the content item which indicates whether a uniform resource indicator of the content item is on a white list associated with the cache entry component of the server.

10. The server of claim 5 wherein the cache lookup determines whether to maintain a content item stored in the cache as valid by:
examining data related by the web header collection object of the content item stored in the cache to determine whether the copy is limited to a particular group of clients; and
examining data related by the web header collection object of the content item stored in the cache to determine whether the copy is expired.

11. The server of claim 5 wherein the cache lookup retrieves the stored content item from the cache by cloning the content item stored in the cache.

12. A method of responding to hypertext transfer protocol (HTTP) requests from a plurality of clients, each HTTP request requesting content via a web request object and a web response object associated therewith, said method comprising:
extending, at a server, the web request object to create a cacheable web request object, said cacheable web request object implementing a cache lookup policy;
overriding the web request object with the created cacheable web request object in response to receiving the HTTP request from a particular client of the plurality of clients at a server, said cacheable web request object derived from the web request object;
determining whether the HTTP request is to be retrieved from the cache or retrieved from a content item provider as a function of the cache lookup policy based on determinations including locating a response in a cache and determining the response is valid, the determinations being related to an examination of data representative of the HTTP request stored in the cache;
maintaining the validated located response in the cache for a period of validity indicated by data representative of the HTTP request in a header thereof;
providing the validated located response in the cache to the particular client in response to the received HTTP request when the response is located in the cache;
forwarding, from the cache lookup policy to the web request object, the received HTTP request for sending, by the web request object, a web HTTP request when the response is not located in the cache; and
receiving a web HTTP response from a content provider and receiving content items associated with the content provider in response to the web HTTP request from the web request object, and providing the web HTTP response from the content provider to the particular client in response to the received HTTP request, said receiving further comprising:
determining, by a cache entry policy of the server, whether the web HTTP response from the content provider is to be stored in the cache, based on determinations, including validity determinations;
storing, as a function of said determining a data stream of the web HTTP response in the cache as a memory stream, storing the content items received from the content provider in the cache and deleting not valid content items from the cache, and storing a HTTP header of the web HTTP response in a web header collection object representative of the HTTP request;
aggregating the valid content items in the cache with the content items received from the content provider;
associating the aggregated content items to the HTTP response stored in the cache; and
exposing the web HTTP response as a stream such that the server does not differentiate between the web HTTP response retrieved from the cache and the web HTTP response retrieved from the content provider.

13. The method of claim 12, wherein determining whether the HTTP request is cacheable comprises analyzing data representative of the HTTP request which enables a comparison between a uniform resource indicator of the HTTP request and a white list of the server according to the cache lookup policy.

* * * * *